March 15, 1966     B. R. OXEL     3,239,880
APPARATUS FOR DETERMINING THE EXPANSIVE PRESSURE
OF MOLDED POLYSTYRENE BEADS
Filed July 20, 1964     2 Sheets-Sheet 1
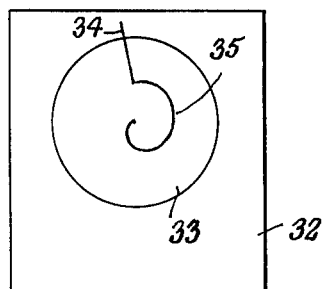
FIG.1.
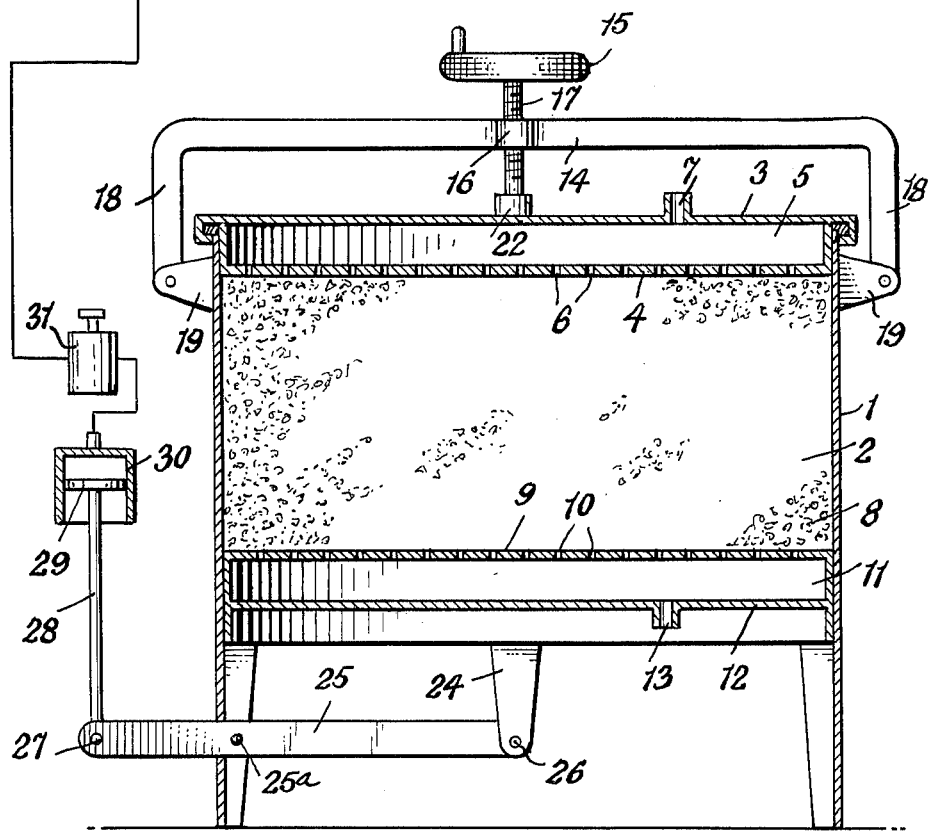
INVENTOR.
Berton R. Oxel
BY
Attorney

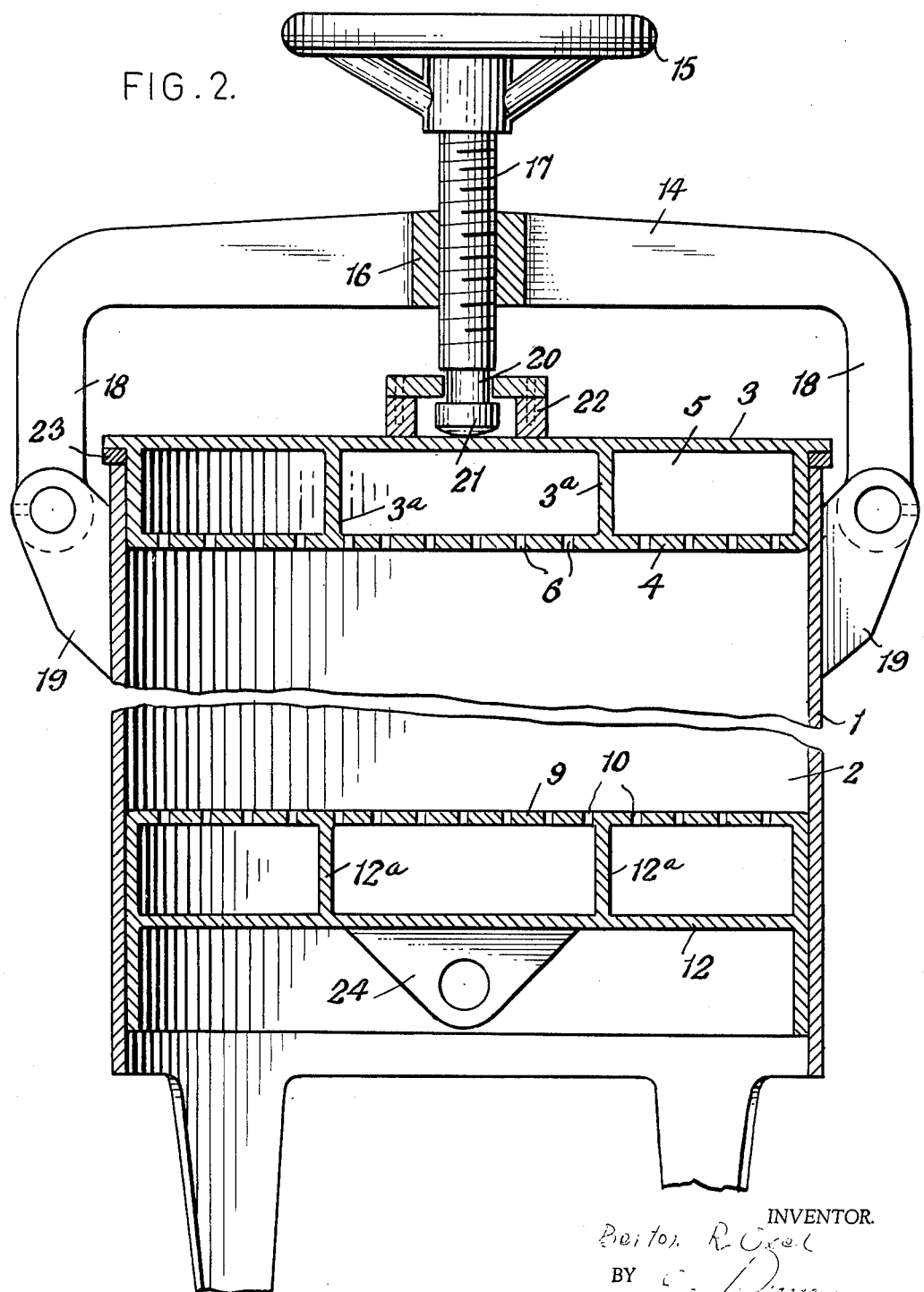

3,239,880
APPARATUS FOR DETERMINING THE EXPANSIVE PRESSURE OF MOLDED POLYSTYRENE BEADS
Berton R. Oxel, New Castle, Pa., assignor to Dyfoam Corporation, New Castle, Pa., a corporation of Pennsylvania
Filed July 20, 1964, Ser. No. 383,821
5 Claims. (Cl. 18—5)

This invention relates to apparatus by which the expansion characteristics of polystyrene beads or other expansible plastics can be checked and regulated.

It is an object of the invention to provide an indicating and recording device by which the expansion pressure of the beads will be disclosed to indicate that such pressure is correct for the securement of a satisfactory molded product. It is known that for numerous reasons such as for example, a low or high amount of blowing agent used in the batch, a low or high expansion will occur. Also improper temperature, too fast feeding of the product into a mold and other factors often result in too little or too great expansion of the beads, so that a poor product is the result.

It is therefore important that the expansion characteristics of the material be maintained at a level at which the best molding results are secured and an important object of the present invention is to provide means by which any deviation from the desired expansion in the product can be ascertained and corrected accordingly.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a diagrammatic view of an apparatus for checking and controlling the expansibility of expandable polystyrene beads or foam during its expansion, the apparatus being constructed according to the present invention, and FIG. 2 is a vertical sectional view of the heating chamber and its associated parts, some of the elements illustrated in this view, differing slightly from similar elements shown in the diagrammatic representation shown in FIG. 1.

Referring to the drawings, 1 indicates a cylindrical casing or container, open at its top and bottom and constituting a chamber 2 in which the polystyrene beads 8 are placed in preparation to the test to determine the extent of their expansibility. Such a test is useful to ascertain the reaction of the beads when they are subjected to steam and a cooling cycle. It has been found desirable to determine whether high expansibility is present in the beads, and which results in good fusion, or whether low expansibility and resultant poor fusion takes place.

The chamber 2 is closed at the top by a removable double-walled closure member or cover which includes a top plate 3 and a bottom plate 4 spaced therefrom by partitions 3a to provide for a steam chamber 5 located between the plates 3 and 4. The bottom plate 4 of the closure or cover is provided with a multitude of perforations 6 or is foraminous. The steam is admitted from a suitable source into the chamber 5 by way of the entrance opening 7 and the steam passes through the perforations 6 to reach the beads 8 contained in the chamber 2.

The bottom of the chamber 2 is formed by a hollow member which includes a perforated or foraminous plate 9 constituting a movable platen, having perforations 10 through which steam can pass to reach the beads 8 contained in the chamber 2. A steam chamber 11 is located between the perforated plate 9 and a bottom plate 12, the latter plate being provided with a steam inlet 13 connected to a source of steam. The plates 12 and 9 are spaced by partitions 12a.

The cover member 5 is clamped down on top of the casing 1 by means of a screw 17 provided at the top with a hand-wheel 15. The screw 17 is threadably extended through the hub portion 16 of a yoke 14, said yoke 14 having downturned ends 18 secured in lugs 19 projecting laterally from the sides of the casing 1 at substantially diametrically opposite points thereon near the top of the casing. As will be seen in FIG. 2, the screw 17 is grooved near its lower end as shown at 20 and is provided with a head 21 located below the groove. Said head is confined in a casing 22 secured at the top of the upper plate 3 of the closure or cover member. The above-described arrangement is such that the closure or cover can be firmly clamped down on the top of the casing by the manipulation of the hand-wheel 15 and held stationarily on the casing during the expansion tests. A gasket 23 insures a tight seal between the cover or closure and the top of the container.

The bottom of the container is movable piston-like within the chamber 2 under the pressure of the beads 8 during their expansion and it is provided below the plate 12 with lugs 24 to which one end of a pivoted lever 25 is pivotally attached at 26. The lever is pivoted at 25a and the opposite end of the lever is pivoted at 27 to the lower end of a rod 28 having its upper end attached to a piston 29 operative in an air cylinder 30.

From the foregoing, it will be seen that the described apparatus includes a casing or container having a fixed perforated top platen or closure and a movable bottom platen, the latter being connected by linkage to an air cylinder. The piston 29 in the cylinder 30, is balanced by a pressure regulator 31 of known construction which keeps the bottom platen 9 in a constant or predetermined position except when displaced by the expansive pressure of the beads. The pressure regulator 31 is connected to a chart-type recorder 32 and causes the recording of pressures thereon.

To test the expansibility of the beads in the chamber 2, the hand-wheel 15 is manipulated to cause raising of the cover or closure member 3 to permit the chamber 2 to be filled with a predetermined quantity of the beads, the amount of the beads being measured by means of a suitable measuring vessel. The cover or closure member 3 is then closed down firmly on the top of the casing by operation of the handwheel. Steam is then injected into the steam chambers 5 and 11 at a temperature of 215–230° F. The steam enters through the perforations 6 and 10 to reach the pre-expanded polystyrene beads. The steam causes such pre-expanded beads to further expand, such further expansion filling the void areas between the individual beads, creating a solid form which conforms to the interior of the casing 1, the plastic being softened and causing the beads to become fused together.

During the expansion and softening period a pressure is created within the chamber 3 which is transmitted to the mechanism described, and to the pressure regulator and recorder 31 which translates the conveyed pressure to the chart recorder 32. A thirty-second period of time is usually all that is required to supply the required heat to develop the expansion and softening of the plastic beads. After the period of treatment by the steam, the steam supply is closed off and drain valves are opened to release all steam pressure and the cooling period then begins. This cooling can be done in the ambient temperature of the room. The pressures in the molded block will slowly return to zero, which movement is recorded on the chart recorder 32. The pen 34 of the recorder, which is of known construction, records the curve on a chart 33 by means of the variation in pressure in the air cylinder, diagrammatically shown at 30. In this manner, the entire cycle can be recorded and an evaluation of the bead quality determined.

The curve 35 produced on the chart 33 can be readily redrawn on a graph chart. The curve produced on the chart will indicate, when the curve is high, that a high degree of expansibility is present in the beads being tested with a guarantee of good fusion. A low curve indicated on the chart shows low expansibility and bad fusion. A curve that collapses immediately after it has reached the top will indicate shrinkage in volume of the specimen and an increase in its density. A curve that remains on top too long, say for 8–10 minutes, will indicate the presence of too much blowing agent and an abnormal cooling period will then be required before the specimen will be cool enough to permit the casing to be opened and the specimen removed therefrom.

The data obtained by an apparatus of this kind is important and useful for classifying material for quality control. By the obtaining of the data secured by this device manufacturers of these foam plastics will be able to secure better and more workable quality in the product for its intended purpose. Molders will be able to pre-check their materials before goods are produced therefrom, thereby determining bead quality. In addition, the determination of bead quality and characteristics in advance of actual production, enables the production machinery to be set for best results.

Having thus described an embodiment of the invention, it is obvious that the same is not to be restricted thereto, but is broad enough to cover all structures coming within the scope of the annexed claims.

What I claim is:

1. An apparatus for determining the expansive pressure of polystyrene beads comprising, a casing for containing beads to be tested, a cover fitted stationarily over the top of the casing, said cover including a perforated lower plate and an imperforate upper plate, the plates defining a steam chamber between them, a movable platen within the casing, said platen being of a shape to closely conform to the interior of the casing, said platen including a steam chamber and passages permitting the entry of steam from the latter chamber into the interior of the casing, pressure means operative to hold the platen in a predetermined position, and recording means connected to the platen for recording movements of the platen from a predetermined position under expansive pressure of the bead contents of the casing.

2. An apparatus for determining the expansive pressure of polystyrene beads as provided for in claim 1, wherein means is provided for clamping down the cover on the top of the casing, the movable platen being slidable piston-like within the casing, and linkage extending between the platen and recording means.

3. An apparatus for determining the expansive pressure of polystyrene beads comprising, a casing, a cover member fitted on top of the casing, clamping means for holding the cover member down on top of the casing, the cover member including upper and lower walls defining a steam chamber between them, the lower wall being perforated to permit steam to pass from said chamber to the interior of the casing, a platen movably fitted within the casing, the platen including upper and lower walls defining a steam chamber between them, the upper wall of the platen being perforated to permit the passage of steam through it from the steam chamber, a pressure regulator connected by linkage to the platen and recording means for indicating pressure developed by the expansibility of the beads, said recording means including a chart on which pressure changes are shown.

4. An apparatus for determining the expansive pressure of polystyrene beads comprising, a casing for containing beads to be tested, a cover closing the top of the casing, said cover including a pair of horizontal plates defining a steam chamber between them, a movable platen within the casing, said platen closely conforming to the interior shape of the casing, said platen including spaced plates defining a steam chamber between them, the upper one of said plates having passages permitting the passage of steam from the latter steam chamber into the interior of the casing, pressure means holding the platen in an established position, and recording means connected to the platen and recording movements of the platen from said predetermined position under the expansive pressure of the bead contents of the casing.

5. An apparatus as provided for in claim 4, wherein the cover is held in closed position by means of a yoke extending across the top of the same and a screw coupled to said coved and threadable through the yoke, and a hand-wheel provided on the screw.

References Cited by the Examiner

UNITED STATES PATENTS

| | | | |
|---|---|---|---|
| 2,332,674 | 10/1943 | Smith | 264—40 XR |
| 2,956,307 | 10/1960 | Fahrni | 264—40 XR |
| 3,042,967 | 7/1962 | Edberg | 18—5 |
| 3,141,192 | 7/1964 | Benedetto | 18—5 |

OTHER REFERENCES

Expandable Polystyrene, catalogue, Springfield Cast Product Co.

WILLIAM J. STEPHENSON, *Primary Examiner.*